Patented Mar. 6, 1951

2,544,630

UNITED STATES PATENT OFFICE 2,544,630

THERAPEUTIC COMPOSITIONS

Charles Paul Hegarty, Lansdowne, and Willard F. Verwey, Springfield, Pa., assignors to Sharp & Dohme, Incorporated, Philadelphia, Pa., a corporation of Maryland No Drawing. Application November 16, 1948, Serial No. 60,413

2 Claims. (Cl. 167—65)

This invention relates to therapeutic compositions and more particularly to compositions of this character which contain antibiotics having a synergistic effect.

The search for a better therapeutic agent than the ones at present known, is a never-ending one. In the fight against infectious diseases to which mankind is prey, an effort is constantly being made to find a substance which is more effective against the disease-producing bacteria. In general, this effort is usually directed along the line of obtaining a new therapeutic principle which will have a more pronounced antibacterial action.

The present invention resides in the discovery that instead of finding a new antibiotic substance to obtain an increased killing action against microbes, this desired result can be obtained by combining into one composition, certain known antibiotic substances. It would be expected that this combination of antibiotic substances would result, at best, in a bactericidal action which is the sum of the killing action which would be obtained from the use of each substance when used alone. It is surprising, therefore, to find, as a result of the present invention, that a greatly increased antibacterial activity is obtained by the conjoint use of a selected group of antibiotics. In addition, it has been discovered that whereas bacteria which survive the initial killing effect of a given concentration of a single antibiotic substance may become resistant to this agent and once more begin to multiply, organisms which have survived corresponding concentrations of two agents acting together do not multiply as rapidly or do not multiply at all.

More specifically considered, the present invention pertains to the discovery that the addition together in a single composition, of two or more of the antibiotics: typrothricin, streptomycin and bacitracin, will give an increased or synergistic bactericidal effect considerably greater than the mere sum of their individual killing actions. Moreover, tests have conclusively shown that such a combination of these selected antibiotics, brings about no adverse results such as instability of the composition on standing, or toxicity to the person to whom the composition is administered, when combinations are employed having concentrations of the antibiotic agents that are usually used when the agents are used individually.

The antibiotics which are to be combined, may be brought together in any commonly used vehicle which experiment shows, will not have an adverse effect upon the agents used. Thus, the selected antibiotics from the above enumerated group may be combined either in an ointment for topical application, they may be combined in a liquid for application to body surfaces and nonserous cavities, or they may be added together in tablet form for oral administration.

The relative amounts of the particular antibiotics to be combined, is not of critical importance. Tests have shown that marked potentiation is obtained if each of the ingredients is present only in an amount which would just produce antibacterial activity if it were used by itself. Thus, the lower limit for the content of any one agent, is the threshold value for obtaining bacteriostatic conditions.

The upper limit of concentration of any one agent is fixed primarily by established toxic concentrations of the individual antibiotic substances themselves. In certain dosage forms the combined agents may constitute the entire amount of the therapeutic composition, because any one of the antibiotics may be used in a concentration down to the value at which experiment has shown that marginal results are obtained. As the particular antibiotics which are here contemplated are known, this lower limit for their individual concentration may be found from published sources.

It may be observed that the most pronounced synergistic effect has been found to result from the combined use of streptomycin and tyrothricin. Next to this, the conjoint use of bacitracin and tyrothricin gives excellent synergistic results. Unexpected potentiation is also obtained by the addition together of streptomycin and bacitracin. As has been noted, all three of these agents may be used together, if desired.

The tyrothricin which is used may, for example, be that which is commercialy available on the open market. Or, it may be prepared by methods described in the following papers:

1. Dubos, R. J., J. Experimental Medicine, 70 (1939), 1.
2. Dubos, R. J., Hotchkiss, R. D., Ibid., 73 (1941), 629.
3. Hotchkiss, R. D., Advances in Enzymology, New York, 4 (1944), 153.

The streptomycin which is used may likewise be that which is obtainable commercially. Or it may be prepared by technics similar to those described in the following papers:

1. Schatz, A., Bugie, E., Waksman, S. A., Proceedings of Society Experimental Biology and Medicine, 55 (1944), 66.
2. Brook, M. J., Wick, A. N., DeVries, W. H., Harris, R., Cartland, G. F., Journal Biological Chemistry, 165 (1946), 463.

The bacitracin which is used may, for example, be prepared according to the processes described in the following papers:

1. Johnson, B. A., Anker, H., Meleney, F. L., Science, 102 (1945), 376.
2. Anker, H. S., Johnson, B. A., Goldberg, J., Meleney, F. L., Journal of Bacteriology, 55 (1948), 249.

Representative examples of the invention are the following. In these examples the antibiotics were added in the indicated amounts to the designated cultures. All cultures were incubated at 37° C. and colony counts were made from dilutions of samples withdrawn at the intervals set forth.

*Example 1*

The following solutions were prepared:

| Solution # | 1 | 2 | 3 |
|---|---|---|---|
| Streptomycin_____µg_ | 400 | _____ | 400 |
| Bacitracin_____units_ | _____ | 250 | 250 |
| Distilled water q. s._____ml_ | 10.0 | 10.0 | 10.0 |

1 ml. of each of these three solutions were placed in individual test tubes each containing 8 ml. of normal human serum and 1 ml. of a three hour broth culture of *Micrococcus pyogenes* var. aureus. A fourth tube served as a control and contained 1 ml. of nutrient broth instead of the solutions to be studied. The numbers of viable organisms per ml. remaining after three hours and twenty-four hours were determined by plate counts carried out in nutrient agar. These results are given in the table below.

| Tube # | 1 | 2 | 3 | 4 |
|---|---|---|---|---|
| Antibiotic | Streptomycin_ | Bacitracin___ | Streptomycin, 4 µg./ml____ | Control. |
| Final Concentration | 4 µg./ml_____ | 2.5 u./ml____ | Bacitracin, 2.5 u./ml_____ | No Antibiotic. |
| Time | Viable Bacteria per ml. after Times Indicated | | | |
| 3 hrs_____ | 6,900_____ | 19,000_____ | 5,600_____ | 12,000,000. |
| 24 hrs____ | >3,000,000 ___ | >3,000,000 __ | <100_____ | 200,000,000. |

It will thus be seen that the combination of streptomycin and bacitracin has a killing effect which is considerably greater than the mere sum of the killing effect of these two agents when used alone.

*Example 2*

The following solutions were prepared:

| Solution # | 1 | 2 | 3 |
|---|---|---|---|
| Tyrothricin alcoholic solution, 10 µg./ml____ml_ | 0.5 | _____ | 0.5 |
| Streptomycin_____units_ | _____ | 250 | 250 |
| Distilled water q. s._____ml_ | 10.0 | 10.0 | 10.0 |

2 ml. of each of these three solutions were placed in individual test tubes each containing 6.0 ml. of normal horse serum inoculated three hours previously with a broth culture of *Micrococcus pyogenes* var. aureus. A fourth tube served as a control and was identical with the others except that it contained 2 ml. of water instead of the solutions to be studied. The numbers of viable bacteria (per ml. of mixture) remaining after one hour, three hours, and twenty-four hours incubation at 37° C. were determined by plate counts carried out in nutrient agar. These results are given in the table below.

| Tube # | 1 | 2 | 3 | 4 |
|---|---|---|---|---|
| Bactericidal Agent | Tyrothricin | Streptomycin | Tyrothricin and Streptomycin | Control (No antibiotic) |
| Viable Organisms per ml.: | | | | |
| 1 hr____ | 355,000 | 1,310,000 | 5,950 | 1,765,000 |
| 3 hrs___ | 455,000 | 425,000 | <100 | 1,650,000 |
| 24 hrs__ | 5,100,000 | 1,070,000 | <100 | 17,900,000 |

It can be seen that the combination of streptomycin and tyrothricin permitted fewer organisms to survive after each time interval and very notably prevented the remultiplication which was observed with both streptomycin and tyrothricin after twenty-four hours.

*Example 3*

The following solutions were prepared:

| Solution # | 1 | 2 | 3 |
|---|---|---|---|
| Tyrothricin Alcoholic solution, 10 µg./ml_ __ml_ | 0.5 | _____ | 0.5 |
| Bacitracin_____units_ | _____ | 200 | 200 |
| Distilled water q. s._____ml_ | 10.0 | 10.0 | 10.0 |

2.0 ml. of each of these three solutions were placed in individual test tubes each containing 6.0 ml. of normal horse serum inoculated three hours previously with a broth culture of *Micrococcus pyogenes* var. aureus. A fourth tube served as a control and was identical with the others except that it contained 2.0 ml. of water instead of the solutions to be studied. The numbers of viable bacteria (per ml. of mixture) remaining after one hour, three hours, and twenty-four hours incubation at 37° C. were determined by plate counts carried out in nutrient agar. These results are given in the table below.

| Tube # | 1 | 2 | 3 | 4 |
|---|---|---|---|---|
| Viable Organisms per ml. after— | Tyrothricin, 125 µg./ml. | Bacitracin, 5u./ml. | Tyrothricin 125 µg./ml., Bacitracin 5 u./ml. | Control; No Antibiotic |
| 1 hr_____ | 665,000 | 2,400,000 | 400 | 7,600,000 |
| 3 hrs_____ | 360,000 | 1,335,000 | 100 | 7,000,000 |
| 24 hrs_____ | 2,400,000 | <100 | <100 | 39,000,000 |

It can be seen that the combination of bacitracin and tyrothricin caused the death of the bacteria at a much more rapid rate than did either of these substances acting alone.

The experiments using solutions containing combinations of tyrothricin, streptomycin, and bacitracin that are given in Examples 1, 2, and 3 are illustrations of the increased activities of these combined antibiotics against bacteria and further demonstrate that the increased activities that result from such combinations occur even in the presence of blood serum. This result is not limited to simple solutions of these antibiotic agents but has been demonstrated also with more complex pharmaceutical products containing these antibiotic agents. Representative examples of those products in which increased bactericidal effectiveness has been obtained from the combination of these antibiotics are given below.

*Example 4*

A throat lozenge is made up of equal parts by weight of undefatted tyrothricin and bacitracin. To this is added customary ingredients to increase the bulk and impart a desirable taste to the lozenges, and to also make it suitable for compressing, such as powdered sugar, salt, glucose, peppermint, magnesium stearate and water. The ingredients are intermixed and compressed in a tablet machine.

*Example 5*

An ointment is made up of substantially four parts of tyrothricin, five parts of streptomycin and ten parts of bacitracin. To this is added petrolatum in a quantity to produce the final desired consistency. The ointment is made in a conventional manner by first dehydrating the petrolatum and subjecting it to a blending action and adding a portion of the antibiotic mixture to it. The entire ingredients are then stirred together to obtain adequate distribution.

From these examples it will be evident that other pharmaceutical compositions can be formulated. Thus, the selected antibiotic mixture can be made into suppositories, suspensions and powders as well, by conventional procedures. In like manner, it is to be understood that the relative proportions in the examples are not critical and that the invention can be practiced if one or more of the antibiotics to be combined, is each present in an amount which would give bacteriostatic conditions if used alone. This minimal amount is dependent upon the nature of the particular bacteria which may be present.

What we claim is:

1. A therapeutic composition having synergistic antibacterial action which comprises tyrothricin and bacitracin, each antibiotic being present in a minimal amount which, if used alone, would produce a bacteriostatic effect.

2. A therapeutic composition having synergistic antibacterial action which comprises tyrothricin and bacitracin, each antibiotic being present in a minimal amount which, if used alone, would produce a bacteriostatic effect and a maximal amount which approaches toxic conditions.

CHARLES PAUL HEGARTY.
WILLARD F. VERWEY.

REFERENCES CITED

The following references are of record in the file of this patent:

Amer. J. Pharm., Nov. 1948, page 439.
Physician's Bulletin, Aug. 1947, page 120.
J. Amer. Pharm. Assn. Scientific Edition, May 1946, page 147.
J. Urology, May 1947, pages 902 to 926.
Amer. J. Medical Sciences, Feb. 1948, pages 136–148.